US009037387B2

(12) United States Patent
Miyake

(10) Patent No.: US 9,037,387 B2
(45) Date of Patent: May 19, 2015

(54) CONTROL DEVICE FOR INTERNAL COMBUSTION ENGINE

(75) Inventor: Teruhiko Miyake, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 197 days.

(21) Appl. No.: 13/702,688

(22) PCT Filed: Jun. 8, 2010

(86) PCT No.: PCT/JP2010/060004
§ 371 (c)(1),
(2), (4) Date: Dec. 7, 2012

(87) PCT Pub. No.: WO2011/155075
PCT Pub. Date: Dec. 15, 2011

(65) Prior Publication Data
US 2013/0085658 A1 Apr. 4, 2013

(51) Int. Cl.
*G06F 19/00* (2011.01)
*G06G 7/70* (2006.01)
*F02D 45/00* (2006.01)
*F02D 41/24* (2006.01)
*G01K 1/08* (2006.01)

(52) U.S. Cl.
CPC ............ *F02D 45/00* (2013.01); *F02D 41/2441* (2013.01); *F02D 41/2448* (2013.01); *F02D 41/2451* (2013.01); *F02D 2200/0408* (2013.01); *F02D 2200/0802* (2013.01); *F02D 2200/0804* (2013.01)

(58) Field of Classification Search
USPC ......... 73/23.25, 23.31, 114.69; 701/112, 113; 123/179.4, 179.15, 179.13; 374/141, 374/144
See application file for complete search history.

(56) References Cited

U.S. PATENT DOCUMENTS 5,377,112 A * 12/1994 Brown et al. ................. 701/115
5,526,266 A * 6/1996 Rutan et al. .................... 701/100
5,544,639 A * 8/1996 Shouda et al. ................ 123/676
5,566,546 A * 10/1996 Rumpsa et al. ................. 60/274
5,614,664 A * 3/1997 Yamagishi ................. 73/114.38
5,722,236 A * 3/1998 Cullen et al. ..................... 60/274
5,808,186 A * 9/1998 Matsumoto et al. ....... 73/114.03
5,881,552 A * 3/1999 Iwata et al. ...................... 60/284
6,092,016 A * 7/2000 Sarangapani et al. ........ 701/102
6,393,357 B1 * 5/2002 Holmes et al. ................ 701/115
6,397,585 B2 * 6/2002 Kitajima et al. ................ 60/284
(Continued)

FOREIGN PATENT DOCUMENTS

JP 07034924 A 2/1995
JP 08074646 A 3/1996
(Continued)

*Primary Examiner* — Stephen K Cronin
*Assistant Examiner* — Brian Kirby
(74) *Attorney, Agent, or Firm* — Gifford, Krass, Sprinkle, Anderson & Citkowski, P.C.

(57) ABSTRACT

A control apparatus for an internal combustion engine having a means for performing a model calculation to calculate, as an exhaust temperature calculation value, the temperature of exhaust gas in an exhaust branch tube at the time of starting an engine, using a model representing the temperature behavior of the exhaust gas in the exhaust branch tube during stop of an engine; and an exhaust temperature actual measurement value output means for detecting the temperature of exhaust gas in the exhaust branch tube, and outputting the detected temperature as an exhaust temperature actual measurement value, wherein the model includes at least one parameter.

6 Claims, 3 Drawing Sheets

(56) References Cited

U.S. PATENT DOCUMENTS

| | | | | |
|---|---|---|---|---|
| 6,851,256 | B2 * | 2/2005 | Chamoto et al. | 60/280 |
| 6,945,034 | B2 * | 9/2005 | Ueno et al. | 60/288 |
| 6,970,800 | B2 * | 11/2005 | Park | 702/130 |
| 7,111,455 | B2 * | 9/2006 | Okugawa et al. | 60/295 |
| 7,316,157 | B2 * | 1/2008 | Ohsaki | 73/114.69 |
| 7,426,433 | B1 * | 9/2008 | Wear | 701/103 |
| 7,534,033 | B2 * | 5/2009 | Prinz et al. | 374/144 |
| 7,558,668 | B2 * | 7/2009 | Ammineni et al. | 701/114 |
| 7,596,941 | B2 * | 10/2009 | Takubo | 60/285 |
| 7,921,944 | B2 * | 4/2011 | Russell et al. | 180/65.265 |
| 8,245,501 | B2 * | 8/2012 | He et al. | 60/286 |
| 8,447,500 | B2 * | 5/2013 | Suzuki et al. | 701/105 |
| 8,479,494 | B2 * | 7/2013 | Enomoto et al. | 60/276 |
| 2006/0117737 | A1 | 6/2006 | Ohsaki | |
| 2007/0000235 | A1 | 1/2007 | Ohsaki | |
| 2007/0009878 | A1 | 1/2007 | Berman | |
| 2011/0154821 | A1 * | 6/2011 | Evans-Beauchamp | 60/615 |

FOREIGN PATENT DOCUMENTS

| | | | |
|---|---|---|---|
| JP | 2004-257355 | A | 9/2004 |
| JP | 2006-161625 | A | 6/2006 |
| JP | 2007-009878 | A | 1/2007 |
| JP | 2007009878 | A | 1/2007 |
| JP | 2007-107531 | A | 4/2007 |

* cited by examiner

CONTROL DEVICE FOR INTERNAL COMBUSTION ENGINE

TECHNICAL FIELD

The present invention relates to a control device for an internal combustion engine.

BACKGROUND ART

Patent Document 1 discloses a method of calculating a gas temperature in an exhaust system of an internal combustion engine through calculation using a model. Further, the designs of the exhaust system are determined based on a calculated value of the gas temperature in the exhaust system calculated through the method.

CITATION LIST

Patent literature 1: JP 08-74646 A
Patent literature 2: JP 2004-257355 A
Patent literature 3: JP 2007-107531 A
Patent literature 4: JP 07-34924 A

SUMMARY OF INVENTION

1. Technical Problem

The model described in Patent literature 1, incidentally, includes parameters (for example, a heat transfer coefficient on heat transmission of a gas in the exhaust system to a wall of the exhaust system, a surface area of the wall of the exhaust system receiving the heat of the gas in the exhaust system, and the like) for an exhaust system and the gas flowing in the exhaust system. The values of the parameters are obtained in advance through an experiment or the like (hereinafter, the values will be referred to as "initial values"). However, through operation of the internal combustion engine for a long period, for example, soot is accumulated on the inner wall surface of the exhaust system and then the values of the parameters may actually become different from the initial values. In this case, the calculated value of the gas temperature in the exhaust system calculated by the calculation using the model does not match the actual gas temperature in the exhaust system.

It is an object of the present invention to calculate a calculated value of a temperature of exhaust gas that accurately matches an actual temperature of exhaust gas by means of a model representing a behavior of the temperature of exhaust gas discharged from a combustion chamber of an internal combustion engine.

2. Solution to Problem

A first aspect of the present application relates to a control device for an internal combustion engine comprising: a model-calculation means for executing a model-calculation on a temperature of exhaust gas to calculate a calculated value of the temperature of exhaust gas in an exhaust manifold upon an operation of the engine being started by using a model representing a behavior of the temperature of exhaust gas in the exhaust manifold of the engine during the operation of the engine being stopped, the calculated value being referred to as exhaust-gas-temperature-calculated-value; and an output means for outputting a measured value of the temperature of exhaust gas by detecting the temperature of exhaust gas in the exhaust manifold of the engine, the measured value being referred to as exhaust-gas-temperature-measured-value, the model including at least one parameter.

Further, the control device further comprises a learning-to-correction means for executing a learning-to-correction on the parameter included in the model to learn and correct the parameter based on the followings: the measured value of the temperature of exhaust gas output from the output means at a first time point where the engine being stopped; and the measured value of the temperature of exhaust gas output from the output means at a second time point where the engine being started after the first time point, so as to match the calculated value of the temperature of exhaust gas at the second time point calculated through the model-calculation on the temperature of exhaust gas to an actual temperature of exhaust gas in the exhaust manifold at the second time period.

According to the aspect, the following effects may be obtained. Specifically, every time when the learning-to-correction on the parameter is executed, the most recent state of the internal combustion engine affecting the temperature of exhaust gas in the exhaust manifold at operation start-up of the internal combustion engine is updated in the parameter contained in the model. Accordingly, even if the state of the internal combustion engine affecting the temperature of exhaust gas in the exhaust manifold at operation start-up of the internal combustion engine is changed over time, a change of the state of the internal combustion engine over time is updated in the value of the parameter contained in the model with the learning-to-correction on the parameter. As a result, the calculated value of the temperature of exhaust gas which matches the actual temperature of exhaust gas in the exhaust manifold at operation start-up of the internal combustion engine is accurately calculated through the model-calculation on the temperature of exhaust gas.

A second aspect of the present application is the control device according to the first aspect wherein the control device is applied to an internal combustion engine configured to stop the operation of the engine at a frequency enabling an accuracy of the parameter included in the model to be maintained in an acceptable accuracy.

According to the aspect, the following effects may be obtained. Specifically, a higher frequency of operation stop of the internal combustion engine means a higher frequency of learning-to-correction on the parameter. Accordingly, a high accuracy of the parameter contained in the model is maintained at all times. As a result, it is possible to accurately calculate the calculated value of the temperature of exhaust gas which matches the actual temperature of exhaust gas in the exhaust manifold at operation start-up of the internal combustion engine through the model-calculation on the temperature of exhaust gas.

According to a third aspect of the present application, in the first and second aspect, the execution of the learning-to-correction on the parameter is prohibited upon the engine has been continuously in a high-load operation state until immediately before the operation of the engine is stopped and a high-load duration time where the high-load operation state has been continued is equal to or more than a threshold value to prohibit the learning concerning the high-load duration time, the high-load duration time is a time period where the engine is continuously in the high-load operation state, the threshold value to prohibit the learning concerning the high-load duration time is determined in advance so as to be a threshold value relating to the high-load duration time to determine whether or not the learning-to-correction on the parameter is to be executed.

According to the aspect, in the case where a highly loaded state of the internal combustion engine is continued for a long period until immediately before operation stop of the internal combustion engine, the learning-to-correction on the parameter is not executed so as to suppress degradation of the accuracy of the calculated value of the temperature of exhaust gas which is calculated through the model-calculation on the temperature of exhaust gas.

According to a fourth aspect of the present application, in any one of the aforementioned first to third aspects, the execution of the learning-to-correction on the parameter is prohibited upon an engine-being-stopped duration time is equal to or less than a threshold value to prohibit the learning concerning an excessively short period for the engine-being-stopped duration time, the engine-being-stopped duration time is a time period where the operation of the engine is stopped, the threshold value to prohibit the learning concerning the excessively short period for the engine-being-stopped duration time is determined in advance so as to be a threshold value relating to the excessively short period for the engine-being-stopped duration time to determine whether or not the learning-to-correction on the parameter is to be executed.

According to the aspect, in the case where the time during which the operation of the internal combustion engine is stopped is short and a decrease amount of the temperature of exhaust gas in the exhaust manifold during operation stop of the internal combustion engine is small, the learning-to-correction on the parameter is not executed so as to suppress degradation of the accuracy of the calculated value of the temperature of exhaust gas which is calculated through the model-calculation on the temperature of exhaust gas.

According to a fifth aspect, in any one of the aforementioned first to fourth aspects, the execution of the learning-to-correction on the parameter is prohibited upon an engine-being-stopped duration time is equal to or more than a threshold value to prohibit the learning concerning an excessively long period for the engine-being-stopped duration time, the engine-being-stopped duration time is a time period where the operation of the engine is stopped, the threshold value to prohibit the learning concerning the excessively long period for the engine-being-stopped duration time is determined in advance so as to be a threshold value relating to the excessively long period for the engine-being-stopped duration time to determine whether or not the learning-to-correction on the parameter is to be executed.

According to the aspect, in the case where the time during which the operation of the internal combustion engine is stopped is long and a decrease amount of the temperature of exhaust gas in the exhaust manifold during operation stop of the internal combustion engine is large, the learning-to-correction on the parameter is not executed so as to suppress degradation of the accuracy of the calculated value of the temperature of exhaust gas which is calculated through the model-calculation on the temperature of exhaust gas.

According to a sixth aspect of the present application, in any one of the aforementioned first to fifth aspects, an exhaust pipe is connected to the exhaust manifold, an exhaust turbine of a supercharger is located in the exhaust pipe, the model-calculation means executes a model-calculation on a supercharging pressure to calculate a calculated value of the supercharging pressure by the supercharger by using a model that represents a behavior of the supercharging pressure of the supercharger during the supercharger is operated, the calculated value is referred to as supercharging-pressure-calculated-value, the calculated value of the temperature of exhaust gas that is calculated through the model-calculation on the temperature of exhaust gas is used in the model-calculation on the supercharging pressure.

According to the aspect, the following effects may be obtained. Specifically, the model-calculation on the temperature of exhaust gas is executed by means of the model in which the recent state of the internal combustion engine is generally updated affecting the temperature of exhaust gas in the exhaust manifold at operation start-up of the internal combustion engine, through the learning-to-correction on the parameter of the present aspect, so that the calculated value of the temperature of exhaust gas obtained therethrough accurately matches an actual temperature of exhaust gas in the exhaust manifold at operation start-up of the internal combustion engine. Accordingly, it is possible to calculate the supercharging pressure calculated value which accurately matches the actual supercharging pressure through the supercharging pressure model calculation.

According to a seventh aspect of the present application, in any one of the aforementioned first to sixth aspects, the parameter included in the model is learned and corrected so as to match the calculated value of the temperature of exhaust gas to the actual temperature of exhaust gas in the exhaust manifold at the second time period through the learning-to-correction on the parameter based on the followings: the measured value of the temperature of exhaust gas at the first time point; the measured value of the temperature of exhaust gas at the second time point; and the calculated value of the temperature of exhaust gas calculated through the model-calculation on the temperature of exhaust gas as the temperature of exhaust gas in the exhaust manifold at the second time point.

According to the aspect, when the learning-to-correction on the parameter is executed, the most recent state of the internal combustion engine affecting the temperature of exhaust gas in the exhaust manifold at operation start-up of the internal combustion engine is further accurately updated in the parameter contained in the model.

DESCRIPTION OF EMBODIMENTS

Figure 1:
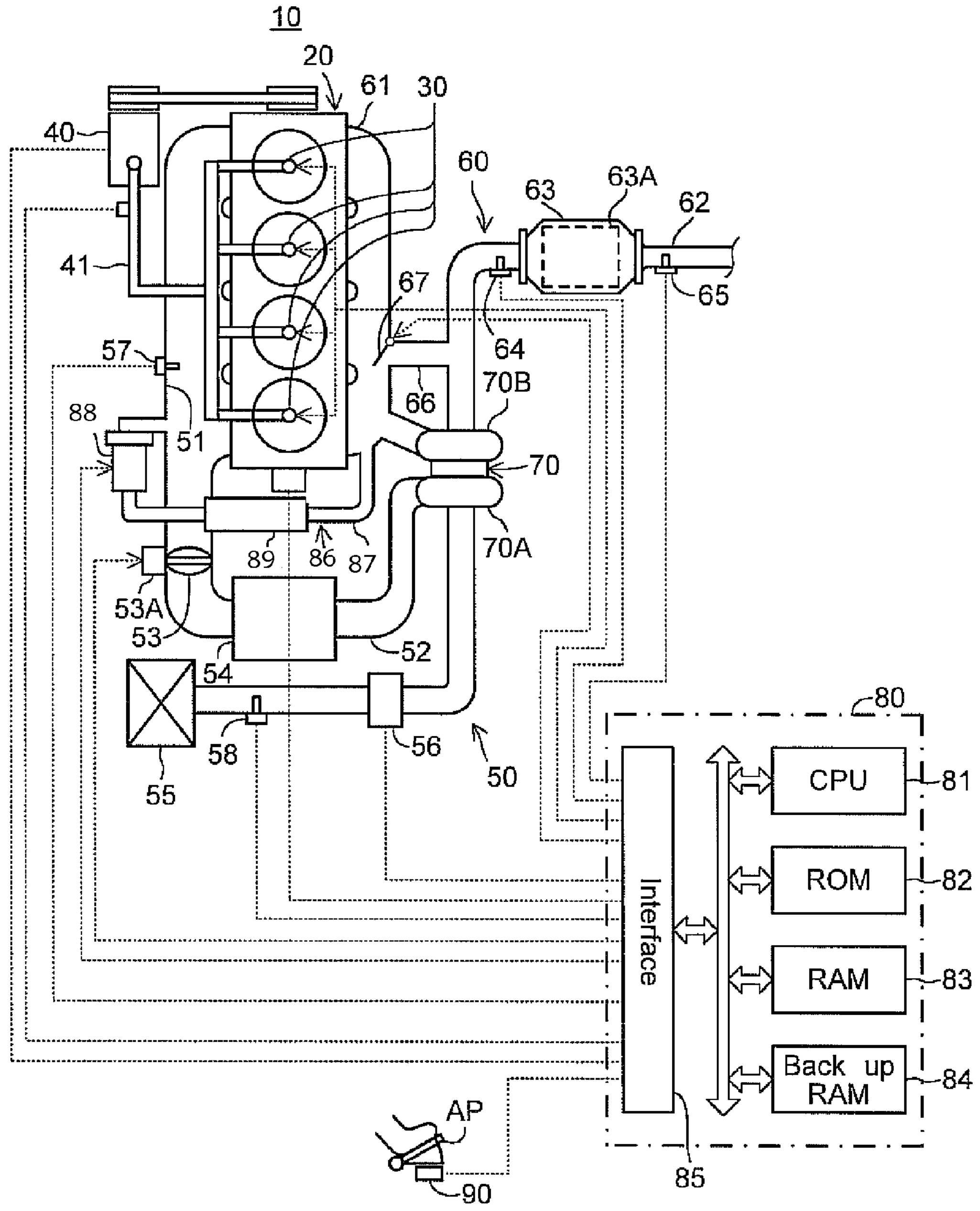
FIG. 1 is an entire diagram of an internal combustion engine to which an embodiment of a control device of the present invention is applied.

Hereinafter, an embodiment of a control device of the present invention will be described with reference to the drawings. FIG. 1 illustrates an internal combustion engine to which an embodiment of a control device of the present invention is applied. The internal combustion engine illustrated in FIG. 1 is a compression self-ignition internal combustion engine (so-called a diesel engine). However, a control device of the present invention may also be applied to a spark ignition internal combustion engine (so-called a gasoline engine).

An internal combustion engine 10 illustrated in FIG. 1 includes a body of an internal combustion engine (hereinafter, referred to as "engine body") 20, a fuel injection valve 30, a fuel pump 40, an intake system 50, and an exhaust system 60. The fuel injection valve 30 is disposed so as to correspond to each of four combustion chambers of the engine body 20. The fuel pump 40 supplies fuel to the fuel injection valve 30 through a fuel supply pipe 41. The intake system 50 is a system which supplies air from outside to the combustion chamber. The exhaust system 60 is a system which discharges outside an exhaust gas discharged from the combustion chamber.

The intake system 50 includes an intake branch pipe (that is, an intake manifold) 51 and an intake pipe 52. One end (that is, a branch portion) of the intake branch pipe 51 is connected to an intake port (not illustrated) which is formed in the engine body 20 so as to correspond to each combustion chamber. Meanwhile, the other end of the intake branch pipe 51 is connected to the intake pipe 52. Inside the intake pipe 52, a throttle valve 53 is provided which controls the amount of air flowing in the intake pipe. An actuator (hereinafter, referred to as "throttle valve actuator") 53A which controls the opening degree of the throttle valve is attached to the throttle valve 53. In addition, the intake pipe 52 is provided with an intercooler 54 which cools air flowing in the intake pipe. Moreover, an air cleaner 55 is disposed at the end which faces outside the intake pipe 52.

Meanwhile, the exhaust system 60 includes an exhaust manifold (that is, an exhaust manifold) 61 and an exhaust pipe 62. One end (that is, a branch portion) of the exhaust manifold 61 is connected to an exhaust port (not illustrated) which is formed in the engine body 20 so as to correspond to each combustion chamber. Meanwhile, the other end of the exhaust manifold 61 is connected to the exhaust pipe 62. The exhaust pipe 62 is provided with a catalyst converter 63. An exhaust gas purifying catalyst 63A which purifies a specific element in the exhaust gas is provided in the catalyst converter 63. A temperature sensor (hereinafter, referred to as "upstream-side temperature sensor") 64 which detects the temperature of the exhaust gas flowing into the catalyst converter 63 is disposed in the exhaust pipe 62 in the upstream of the catalyst converter 63. In addition, a temperature sensor (hereinafter, referred to as "downstream-side temperature sensor") 65 which detects the temperature of the exhaust gas discharged out from the catalyst converter 63 is disposed in the exhaust pipe 62 in the downstream of the catalyst converter 63.

In addition, the internal combustion engine 10 includes a supercharger 70. The supercharger 70 includes a compressor 70A which is disposed in the intake pipe 52 in the upstream of the intercooler 54 and an exhaust turbine 70B which is disposed in the exhaust pipe 62 in the upstream of the catalyst converter 63. The exhaust turbine 70B is connected to the compressor 70A through a shaft (not illustrated). When the exhaust gas causes the exhaust turbine 70B to rotate, the rotation is transferred to the compressor 70A through the shaft and the compressor 70A is rotated.

In addition, the internal combustion engine 10 includes an exhaust gas recirculation device (hereinafter, referred to as "EGR device") 86. The EGR device 86 includes an exhaust gas recirculation pipe (hereinafter, referred to as "EGR pipe") 87. One end of the EGR pipe 87 is connected to the exhaust manifold 61. Meanwhile, the other end of the EGR pipe 87 is connected to the intake branch pipe 51. In addition, the EGR pipe 87 is provided with an exhaust gas recirculation control valve (hereinafter, the exhaust gas recirculation control valve will be referred to as "EGR control valve") 88 which controls the flow rate of the exhaust gas flowing in the EGR pipe 87. The EGR control valve 88 is operated by an actuator (hereinafter, referred to as "EGR control valve actuator") (not illustrated). In the internal combustion engine 10, the flow rate of the exhaust gas flowing in the EGR pipe 87 becomes larger as the opening degree of the EGR control valve 88 becomes larger. Furthermore, the EGR pipe 87 is provided with an exhaust gas recirculation cooler 89 which cools the exhaust gas flowing in the EGR pipe 87.

In addition, a turbine bypass pipe 66 is disposed between the exhaust manifold 61 and the exhaust pipe 62. The turbine bypass pipe 66 connects the exhaust manifold 61 to the exhaust pipe 62 between the exhaust turbine 70B and the catalyst converter 63. In addition, an inlet of the turbine bypass pipe 66 is provided with a turbine bypass valve 67 which opens and closes the inlet. When the turbine bypass valve 67 is opened, the exhaust gas which is discharged from the combustion chamber to the exhaust manifold 61 directly flows into the exhaust pipe 62 in the downstream of the exhaust turbine 70B through the turbine bypass pipe 66 instead of the exhaust turbine 70B. Meanwhile, when the turbine bypass valve 67 is closed, the exhaust gas, which is discharged from the combustion chamber to the exhaust manifold 61, flows into the exhaust turbine 70B instead of the turbine bypass pipe 66.

In addition, an air flow meter 56 which detects a flow rate of air flowing in the intake pipe 52 is attached to the intake pipe 52 in the downstream of the air cleaner 55 and in the upstream of the compressor 70A. A pressure sensor (hereinafter, referred to as "intake pressure sensor") 57 which detects the pressure in the intake pipe 52 is attached to the intake branch pipe 51. In addition, a temperature sensor (hereinafter, the temperature sensor will be referred to as "external air temperature sensor") 58 which detects the temperature of air in the intake pipe (that is, the external air temperature) is disposed in the intake pipe 52 between the air flow meter 56 and the air cleaner 55.

In addition, the internal combustion engine 10 includes an electronic control unit 80. The electronic control unit 80 includes a microprocessor (CPU) 81, a read only memory (ROM) 82, a random access memory (RAM) 83, and a backup RAM (Back up RAM) 84, and an interface 85. The fuel injection valve 30, the fuel pump 40, the throttle valve actuator 53A, the EGR control valve actuator, and the turbine bypass valve 67 are connected to the interface 85, and a control signal for controlling these operations is given from the electronic control unit 80 through the interface 85. In addition, the air flow meter 56, an intake pressure sensor 57, the accelerator opening degree sensor 90 which detects the stepping amount of the accelerator pedal AP, an external air temperature sensor 58, an upstream-side temperature sensor 64, and a downstream-side temperature sensor 65 are also connected to the interface 85, and a signal corresponding to the flow rate detected by the air flow meter 56, a signal corresponding to the pressure detected by the intake pressure sensor 57, a signal corresponding to the stepping amount of the accelerator pedal AP detected by the accelerator opening degree sensor 90, a signal corresponding to the temperature detected by the external air temperature sensor 58, a signal corresponding to the temperature detected by the upstream-side temperature sensor 64, and a signal corresponding to the temperature detected by the downstream-side temperature sensor 65 are input to the interface 85.

In this embodiment, the temperature of exhaust gas in the exhaust manifold 61 at operation start-up of the internal combustion engine 10 (that is, the temperature of the exhaust gas remaining in the exhaust manifold 61 at operation stop of the internal combustion engine) is calculated by the calculation using the model. Further, the calculated temperature is used to control component conditions of the internal combustion engine 10 (for example, the amount of the fuel injected from the fuel injection valve 30, the amount of the gas suctioned into the combustion chamber, the purification amount of the element in the exhaust gas by the exhaust gas purifying catalyst 63A, the supercharging pressure by the supercharger 70, the amount of the exhaust gas introduced into the intake branch pipe 51 through the EGR pipe 87, and the like), or to know the component conditions of the internal combustion engine 10.

Further, in this embodiment, the aforementioned model represents the behavior of the temperature of exhaust gas in the exhaust manifold 61 while the operation of the internal combustion engine 10 is stopped (hereinafter, this model is referred to as "model of temperature of exhaust gas"), and is created based on the law of conservation of mass, the law of conservation of momentum, the law of conservation of energy, and the like for the exhaust gas in the exhaust manifold 61 while the operation of the internal combustion engine 10 is stopped.

In this embodiment, the learning-to-correction on the parameter for the aforementioned model is executed. Now, the learning-to-correction on the parameter is described.

In the description below, a time "at engine start-up" means a time "at operation start-up of the internal combustion engine", a time "at engine stop" means a time "at operation stop of the internal combustion engine", a time "during engine stop" means a time "while operation of the internal combustion engine is stopped", an "engine stop duration" means a time "during operation stop of the internal combustion engine", a time "immediately before engine stop" means a time "immediately before operation stop of the internal combustion engine", an "engine operation state" means an "operation state of the internal combustion engine", an "engine state" means a "state of the internal combustion engine", a "high load operation state" means a "state where the load on the internal combustion engine is relatively high", and an "engine operation" means an "operation of the internal combustion engine".

The aforementioned model of temperature of exhaust gas includes several parameters (that is, coefficients or integers for the behavior of the temperature of exhaust gas in the exhaust manifold 61 during engine stop, for example, a primary delay time constant for a decrease of the temperature of exhaust gas during engine stop, a heat transfer coefficient between the exhaust gas in the exhaust manifold 61 and the wall of the exhaust manifold, a heat transfer coefficient between the wall of the exhaust manifold and the external air, and the like), which are necessary to calculate the temperature of exhaust gas in the exhaust manifold 61 at engine start-up (hereinafter, the temperature will be referred to as "temperature of exhaust gas at start-up") through the model calculation. The values of these parameters (hereinafter, referred to as "model parameters") are different in accordance with the engine states affecting the temperature of exhaust gas at start-up (specifically, the engine state affecting a decrease of the temperature of exhaust gas in the exhaust manifold 61 during engine stop). Accordingly, in the case where the engine state affecting the temperature of exhaust gas at start-up is changed over time (for example, in the case where soot is accumulated on the inner wall surface of the exhaust manifold 61 or the amount of soot accumulated on the inner wall surface of the exhaust manifold 61 is increased), as long as the model parameter value set before the change of the engine state affecting the temperature of exhaust gas at start-up is employed as model parameter value without change, the temperature of exhaust gas at start-up may not accurately be calculated through the model calculation. Accordingly, it is preferable for the model parameter value to be corrected to the value in which the recent state of the engine is updated affecting the temperature of exhaust gas at start-up in order to accurately calculate the temperature of exhaust gas at start-up through the model calculation.

Therefore, in this embodiment, the learning-to-correction on the parameter is executed so as to correct the model parameter value to the value in which the recent state of the engine is updated affecting the temperature of exhaust gas at start-up.

Specifically, in the learning-to-correction on the parameter of this embodiment, the temperature of exhaust gas detected by the upstream-side temperature sensor 64 at engine stop is acquired as temperature of exhaust gas actual measurement value at stop, and the acquired temperature of exhaust gas actual measurement value at stop is stored (that is, memorized) in the electronic control unit 80. Further, the temperature of exhaust gas detected by the upstream-side temperature sensor 64 at engine start-up after that is acquired as temperature of exhaust gas actual measurement value at start-up, the external air temperature detected by the external air temperature sensor 58 is acquired as external air temperature actual measurement value at start-up, the temperature of exhaust gas at start-up is calculated as calculated value of the temperature of exhaust gas at start-up through the model calculation, and the temperature of exhaust gas actual measurement value at start-up, the external air temperature actual measurement value at start-up, and the calculated value of the temperature of exhaust gas at start-up are stored (that is, memorized) in the electronic control unit 80.

Further, an optimal value is calculated (that is, learned) as model parameter value based on the temperature of exhaust gas actual measurement value at stop, the temperature of exhaust gas actual measurement value at start-up, the external air temperature actual measurement value at start-up, and the calculated value of the temperature of exhaust gas at start-up stored in the electronic control unit 80. More specifically, it is assumed that the temperature of exhaust gas decreases along with a primary delay during engine stop, and an appropriate value is calculated (that is, learned) as model parameter value so that the calculated value of the temperature of exhaust gas at start-up calculated through the model calculation matches the temperature of exhaust gas actual measurement value at start-up based on the temperature of exhaust gas actual measurement value at stop, the temperature of exhaust gas actual measurement value at start-up, the external air temperature actual measurement value at stark-up, and the calculated value of the temperature of exhaust gas at start-up stored in the electronic control unit 80.

Then, the model parameter value is corrected based on the calculated value (that is, the learned value).

Accordingly, the following effects may be obtained. Specifically, the recent state of the engine state affecting the temperature of exhaust gas at start-up is updated in the model parameter every time when the learning-to-correction on the parameter is executed. Accordingly, even when the engine state affecting the temperature of exhaust gas at start-up is changed over time, a change in the engine state over time is updated in the model parameter value as long as the learning-to-correction on the parameter is executed. As a result, the calculated value of the temperature of exhaust gas at start-up which matches the actual temperature of exhaust gas at start-up is accurately calculated through the model calculation.

In order to calculate an appropriate model parameter value in the learning-to-correction on the parameter of the aforementioned embodiment, an external air temperature detected by the external air temperature sensor 58 at engine stop may be used instead of the external air temperature detected by the external air temperature sensor 58 at engine start-up.

In addition, in order to calculate an optimal model parameter value in the learning-to-correction on the parameter of the aforementioned embodiment, the external air temperature detected by the external air temperature sensor 58 at engine start-up is not necessary. In this case, in the learning-to-correction on the parameter, the appropriate value is calculated as model parameter value based on the temperature of exhaust gas actual measurement value at stop, the temperature of exhaust gas actual measurement value at start-up, and the calculated value of the temperature of exhaust gas at start-up.

In addition, the calculated value of the temperature of exhaust gas at start-up which is calculated through the model calculation of the aforementioned embodiment is used as below, for example. Specifically, when the supercharging pressure model representing the behavior of the supercharging pressure generated by the supercharger during operation of the supercharger 70 is created based on the law of conservation of mass, the law of conservation of momentum, the law of conservation of energy, and the like for the exhaust turbine 70B, the exhaust gas flowing into the exhaust turbine, the exhaust gas discharged out from the exhaust turbine, the compressor 70A of the supercharger, the gas flowing into the compressor, the gas discharged out from the compressor, and the like, the temperature of exhaust gas at start-up is contained as variable in the supercharging pressure model in many cases. Accordingly, when the electronic control unit 80 uses the supercharging pressure model and calculates the supercharging pressure generated by the supercharger 70 through the model calculation, the calculated value of the temperature of exhaust gas at start-up which is calculated through the model calculation is used in the model calculation of the supercharging pressure.

In this way, when the calculated value of the temperature of exhaust gas at start-up which is calculated through the model calculation is used in the model calculation of the supercharging pressure, the model calculation of the temperature of exhaust gas at start-up is executed by means of the model of temperature of exhaust gas in which the recent state of the engine is generally updated affecting the temperature of exhaust gas at start-up by the aforementioned learning-to-correction on the parameter, and the calculated value of the temperature of exhaust gas at start-up obtained in this way accurately matches the actual temperature of exhaust gas at start-up. Accordingly, the supercharging pressure calculated value which accurately matches the actual supercharging pressure through the model calculation is calculated.

Similarly, even when the fuel injection amount model which represents the behavior of the amount (hereinafter, referred to as "fuel injection amount") of fuel injected from the fuel injection valve 30 during engine operation, the catalyst purification amount model which represents the behavior of the purification amount (hereinafter, referred to as "catalyst purification amount") of the element in the exhaust gas by the exhaust gas purifying catalyst 63A during engine operation, or the EGR amount model which represents the behavior of the amount (hereinafter, referred to as "EGR amount") of the exhaust gas introduced into the intake branch pipe 51 through the EGR pipe 87 during engine operation is created based on the law of conservation of mass, the law of conservation of momentum, the law of conservation of energy, and the like, the temperature of exhaust gas at start-up is included as variable in the fuel injection amount model, the catalyst state quantity model, and the EGR amount model in many cases. Accordingly, when the electronic control unit 80 calculates the fuel injection amount, the catalyst purification amount, or the EGR amount through the model calculation using the fuel injection amount model, the catalyst state quantity model, or the EGR amount model, the calculated value of the temperature of exhaust gas at start-up which is calculated through the model calculation is used in the model calculation of the fuel injection amount, the model calculation of the catalyst purification amount, or the model calculation of the EGR amount.

Of course, the calculated value of the temperature of exhaust gas at start-up which is calculated through the model calculation may be used instead of the detection value obtained by the temperature sensor for the temperature of exhaust gas in the exhaust manifold 61 at engine start-up.

Incidentally, when the engine operation state is in a highly loaded operation state, the temperature of exhaust gas which is discharged from the combustion chamber is high. Further, when the time (hereinafter, the time will be referred to as "high load continuation time") in which the engine operation state is in a highly loaded operation state is long, the wall temperature of the exhaust manifold 61 significantly increases. Further, when the engine operation is stopped while the wall temperature of the exhaust manifold 61 is significantly high, the temperature decrease characteristic of the exhaust gas in the exhaust manifold during engine stop becomes different from a normal characteristic. Accordingly, when the engine operation is stopped while the wall temperature of the exhaust manifold 61 is significantly high and then the aforementioned learning-to-correction on the parameter is executed at engine start-up operation, there is a high possibility that the model parameter value corrected through the learning-to-correction on the parameter is different from the value to be employed as model parameter value. Accordingly, when the engine operation state immediately before engine stop is in a highly loaded operation state for a long time, it is preferable for the temperature detected by the upstream-side temperature sensor 64 at engine stop not to be used in the learning-to-correction on the parameter (that is, the temperature detected by the upstream-side temperature sensor 64 at engine stop is not acquired and the learning-to-correction on the parameter is not executed).

Therefore, in the aforementioned embodiment, a threshold value for the time length during which a highly loaded operation state is continued when the engine operation state immediately before engine stop is in a highly loaded operation state, which is used to determine whether or not to execute the learning-to-correction on the parameter is set in advance as "first learning prohibition threshold value".

Further, when the engine operation state immediately before engine stop is in a highly loaded operation state and the time length during which the state is continued is equal to the first learning prohibition threshold value or more at engine stop, the temperature which is detected by the upstream-side temperature sensor 64 is not acquired and the execution of the learning-to-correction on the parameter is prohibited.

Accordingly, the following effects may be obtained. Specifically, the execution of the learning-to-correction on the parameter is prohibited when there is a high possibility that the accuracy of the calculated value of the temperature of exhaust gas at start-up which is calculated through the model calculation may be degraded, when the model parameter value through the learning-to-correction on the parameter is corrected since a highly loaded operation state immediately before engine stop is in a highly loaded operation state for a long time. Accordingly, it is possible to suppress degradation of the accuracy of the calculated value of the temperature of exhaust gas at start-up which is calculated through the model calculation.

Moreover, in the aforementioned embodiment, in order to determine whether or not the high load duration is equal to the first learning prohibition threshold value or more, there is a need to determine whether or not the engine operation state is in a highly loaded operation state. The determination may be executed, as below, for example. Specifically, through an experiment or the like, obtained in advance as threshold value is the smallest load of the loads such that: the calculated value of the temperature of exhaust gas at start-up highly possibly be out of an acceptable range from the actual temperature of exhaust gas at start-up when the calculated value of the temperature of exhaust gas at start-up is calculated through the model calculation using the model of temperature of exhaust gas of which model parameter is corrected; in the case where the wall temperature of the exhaust manifold 61 at engine stop is significantly high and the learning-to-correction on the parameter is executed at engine start-up. Further, the determination is made when the load of the internal combustion engine 10 is equal to the aforementioned threshold value or more and the engine is in a highly loaded operation state.

In addition, when the engine operation state is in a highly loaded operation state, there is a tendency that the wall temperature of the exhaust manifold 61 becomes different in accordance with the magnitude of the load of the internal combustion engine 10 and the wall temperature of the exhaust manifold becomes higher as the load of the internal combustion engine becomes larger. Therefore, in the aforementioned embodiment, there may be a configuration when it is determined that the engine operation state is in a highly loaded operation state, the average load value of the internal combustion engine 10 during the high load duration is calculated and the first learning prohibition threshold value becomes smaller as the average load value of the calculated internal combustion engine becomes larger. In this case, even when the high load duration becomes shorter as the average load value of the internal combustion engine 10 becomes higher in the high load duration, it is determined that the high load duration is equal to the first learning prohibition threshold value or more and the execution of the learning-to-correction on the parameter is prohibited.

In addition, in order to further reliably prohibit the execution of the learning-to-correction on the parameter when the model parameter value corrected through the learning-to-correction on the parameter is different from a value to be employed as model parameter value, it is preferable for the shortest time to be employed as the aforementioned first learning prohibition threshold value of the high load duration in which the wall temperature of the exhaust manifold 61 at engine stop is significantly high and the temperature decrease characteristic of the exhaust gas in the branch pipe during engine stop becomes out of an acceptable range from a normal characteristic. In other words, it is preferable for the shortest time to be employed as the aforementioned first learning prohibition threshold value of the high load duration in which the wall temperature of the exhaust manifold 61 at engine stop is significantly high and the accuracy of the calculated value of the temperature of exhaust gas at start-up calculated through the model calculation is degraded to an unacceptable accuracy when the model parameter value is corrected through the learning-to-correction on the parameter.

When the opening degree of the turbine bypass valve 67 is relatively large, most of the exhaust gas discharged from the combustion chamber to the exhaust manifold 61 reaches the upstream-side temperature sensor 64 through the turbine bypass pipe 66 (that is, by bypassing the exhaust turbine 70B). Accordingly, in this case, the temperature which is detected by the upstream-side temperature sensor 64 accurately matches the temperature of exhaust gas in the exhaust manifold 61. Accordingly, when the opening degree of the turbine bypass valve 67 at engine stop is relatively large, the model parameter value which is obtained through the learning-to-correction on the parameter using the temperature detected by the upstream-side temperature sensor 64 is a value during which the recent state of the engine is accurately updated affecting the temperature of exhaust gas at start-up.

When the opening degree of the turbine bypass valve 67 is relatively small, most of the exhaust gas which has been discharged from the combustion chamber to the exhaust manifold 61 reaches the upstream-side temperature sensor 64 through the exhaust turbine 70B. In this case, since the exhaust turbine 70B has a high thermal capacity, the heat of the exhaust gas escapes to the exhaust turbine when the exhaust gas passes through the exhaust turbine. Accordingly, in this case, the temperature which is detected by the upstream-side temperature sensor 64 does not match the temperature of exhaust gas in the exhaust manifold 61. Accordingly, when the opening degree of the turbine bypass valve 67 at engine stop is relatively small, the model parameter value which is obtained through the learning-to-correction on the parameter using the temperature detected by the upstream-side temperature sensor 64 is not a value in which the recent state of the engine is accurately updated affecting the temperature of exhaust gas at start-up. Accordingly, when the opening degree of the turbine bypass valve 67 at engine stop is relatively small, it is preferable for the temperature which is detected by the upstream-side temperature sensor 64 not to be used in the learning-to-correction on the parameter (that is, the temperature which is detected by the upstream-side temperature sensor 64 is not acquired and the learning-to-correction on the parameter is not executed).

Therefore, in the aforementioned embodiment, the threshold value for the opening degree of the turbine bypass valve 67, which is used to determine whether or not to execute the learning-to-correction on the parameter, is set in advance as "learning prohibition opening degree threshold value".

When the opening degree of the turbine bypass valve 67 at engine stop is equal to the learning prohibition opening degree threshold value or less, the temperature which is detected by the upstream-side temperature sensor 64 for the learning-to-correction on the parameter is not acquired and the execution of the learning-to-correction on the parameter is prohibited.

The following effects may be obtained as a result. Specifically, the execution of the learning-to-correction on the parameter is prohibited in the case where, when the model parameter value is corrected through the learning-to-correction on the parameter, due to the small opening degree of the turbine bypass valve 67, the accuracy of the calculated value of the temperature of exhaust gas at start-up calculated through the model calculation is degraded. Accordingly, it is possible to suppress degradation of the accuracy of the calculated value of the temperature of exhaust gas at start-up calculated through the model calculation.

In order to further reliably prohibit the execution of the learning-to-correction on the parameter in the case where the model parameter value which is corrected through the learning-to-correction on the parameter does not match a value in which the recent state of the engine is accurately updated affecting the temperature of exhaust gas at start-up, it is preferable for the largest opening degree to be employed as the aforementioned learning prohibition opening degree threshold value for the opening degree of the turbine bypass valve 67 in which the temperature detected by the upstream-side temperature sensor 64 at engine stop does not match the temperature of exhaust gas in the exhaust manifold 61 at that time. In other words, it is preferable for the largest opening degree to be employed as the aforementioned learning prohibition opening degree threshold value for the opening degree of the turbine bypass valve 67 in which the opening degree of the turbine bypass valve 67 at engine stop is small and the accuracy of the calculated value of the temperature of exhaust gas at start-up calculated through the model calculation is degraded to an unacceptable accuracy in the case where the model parameter value is corrected through the learning-to-correction on the parameter.

In the case where the engine stop duration is excessively short, a decrease of the temperature of exhaust gas in the exhaust manifold 61 during engine stop is excessively small. In this case, the model parameter value which is obtained through the learning-to-correction on the parameter using the temperature detected by the upstream-side temperature sensor 64 at engine start-up does not match a value in which the recent state of the engine is updated affecting the temperature of exhaust gas at start-up. Accordingly, in the case where the engine stop duration is excessively short, it is preferable for the temperature which is detected by the upstream-side temperature sensor 64 at engine start-up not to be used in the learning-to-correction on the parameter (that is, the temperature which is detected by the upstream-side temperature sensor 64 at engine start-up is not acquired and the learning-to-correction on the parameter is not executed).

Therefore, in the aforementioned embodiment, the threshold value for the excessively short engine stop duration, which is used to determine whether or not to execute the learning-to-correction on the parameter, is set in advance as "second learning prohibition threshold value".

In the case where the engine stop duration is equal to the second learning prohibition threshold value or less at engine start-up, the temperature which is detected by the upstream-side temperature sensor 64 is not acquired, and the execution of the learning-to-correction on the parameter is prohibited.

The following effects may be obtained as a result. Specifically, the execution of the learning-to-correction on the parameter is prohibited, in the case where the accuracy of the calculated value of the temperature of exhaust gas at start-up calculated through the model calculation is degraded when the model parameter value is corrected through the learning-to-correction on the parameter due to the short engine stop duration and a small amount of decrease of the temperature of exhaust gas in the exhaust manifold 61 during engine stop. Accordingly, it is possible to suppress degradation of the accuracy of the calculated value of the temperature of exhaust gas at start-up calculated through the model calculation.

In order to further reliably prohibit the execution of the learning-to-correction on the parameter in the case where the model parameter value which is corrected through the learning-to-correction on the parameter does not match a value in which the recent state of the engine is updated affecting the temperature of exhaust gas at start-up, it is preferable for the longest time to be employed as the aforementioned second learning prohibition threshold value for the engine stop duration in which a decrease of the temperature of exhaust gas in the exhaust manifold 61 during engine stop is excessively small and the model parameter value which is obtained through the learning-to-correction on the parameter using the temperature detected by the upstream-side temperature sensor 64 at engine start-up does not match a value in which the recent state of the engine is updated affecting the temperature of exhaust gas at start-up. In other words, it is preferable for the longest time to be employed as the aforementioned second learning prohibition threshold value for the engine stop duration in which a decrease of the temperature of exhaust gas in the exhaust manifold 61 during engine stop is excessively small and the accuracy of the calculated value of the temperature of exhaust gas calculated through the model calculation is degraded to an unacceptable accuracy when the model parameter value is corrected through the learning-to-correction on the parameter.

In the case where the engine stop duration is excessively long, a decrease of the temperature of exhaust gas in the exhaust manifold 61 during engine stop is excessively larger. In general, since the temperature of exhaust gas decreases in a quadric-curved manner over time, the temperature decrease amount of the exhaust gas per unit time becomes smaller as the temperature of exhaust gas decreases. Accordingly, when the temperature of exhaust gas decreases to the limit, the temperature decrease amount of the exhaust gas per unit time becomes zero. Accordingly, in the case where the engine stop duration is excessively long, there is a high possibility that the model parameter value which is obtained through the learning-to-correction on the parameter using the temperature detected by the upstream-side temperature sensor 64 at engine start-up does not match a value in which the recent state of the engine is updated affecting the temperature of exhaust gas at start-up. Accordingly, in the case where the engine stop duration is excessively long, it is preferable for the temperature which is detected by the upstream-side temperature sensor 64 at engine start-up not to be used in the learning-to-correction on the parameter (that is, the temperature which is detected by the upstream-side temperature sensor 64 is not acquired and the learning-to-correction on the parameter is not executed).

Therefore, in the aforementioned embodiment, the threshold value for the excessively long engine stop duration, which is used to determine whether or not to execute the learning-to-correction on the parameter, is set in advance as "third learning prohibition threshold value".

In the case where the engine stop duration at engine start-up is equal to the third learning prohibition threshold value or more, the temperature which is detected by the upstream-side temperature sensor 64 is not acquired and the execution of the learning-to-correction on the parameter is prohibited.

The following effects may be obtained as a result. Specifically, the execution of the learning-to-correction on the parameter is prohibited, in the case where the accuracy of the calculated value of the temperature of exhaust gas at start-up which is calculated through the model calculation is degraded when the model parameter value is corrected through the learning-to-correction on the parameter, due to a long engine stop duration and a large amount of decrease of the temperature of exhaust gas in the exhaust manifold 61 during engine stop. Accordingly, it is possible to suppress degradation of the accuracy of the calculated value of the temperature of exhaust gas at start-up calculated through the model calculation.

In order to further reliably prohibit the execution of the learning-to-correction on the parameter in the case where the model parameter value which is corrected through the learning-to-correction on the parameter does not match a value in which the recent state of the engine is updated affecting the temperature of exhaust gas at start-up, it is preferable for the shortest time to be employed as the aforementioned third learning prohibition threshold value for the engine stop duration in which a decrease amount of the temperature of exhaust gas in the exhaust manifold 61 during engine stop is excessively large and the model parameter value which is obtained through the learning-to-correction on the parameter using the temperature detected by the upstream-side temperature sensor 64 at engine start-up does not match a value in which the recent state of the engine is updated affecting the temperature of exhaust gas at start-up. In other words, it is preferable for the shortest time to be employed as the aforementioned third learning prohibition threshold value for the engine stop duration, in the case where a decrease amount of the temperature of exhaust gas in the exhaust manifold 61 during engine stop is excessively large and the accuracy of the calculated value of the temperature of exhaust gas which is calculated through the model calculation is degraded to an unacceptable accuracy when the model parameter value is corrected through the learning-to-correction on the parameter.

It is advantageous when the control device of the aforementioned embodiment is applied to the internal combustion engine of which operation is stopped frequently. Specifically, when the operation of the internal combustion engine 10 is stopped frequently, the frequency of the engine stop state occurs where the learning-to-correction on the parameter of the aforementioned embodiment may be executed increases. Accordingly, since the frequency of the learning-to-correction on the parameter increases, a high accuracy of the model parameter is maintained at all times. As a result, the calculated value of the temperature of exhaust gas which matches the actual temperature of exhaust gas in the exhaust manifold 61 at engine start-up is calculated by means of the model of temperature of exhaust gas.

It should be noted that the internal combustion engine of which operation is frequently stopped indicates, for example, an internal combustion engine which is mounted on a so-called eco-run vehicle (that is, a vehicle equipped with a system which automatically stops the operation of the internal combustion engine at vehicle stop and automatically starts the operation of the internal combustion engine when the accelerator pedal is stepped on) or a hybrid vehicle (that is, a vehicle which is equipped with an internal combustion engine and an electric motor such that the operation of the internal combustion engine is started and stopped in accordance with the vehicle running state).

In addition, a configuration may be employed in which optimal values of the model parameters are obtained through an experiment or the like in accordance with the state of the internal combustion engine immediately before engine stop or the surroundings of the internal combustion engine during engine stop, the values of the model parameters are stored in the form of a map in an electronic control unit, optimal values of the model parameters are read out from the map in accordance with the state of the internal combustion engine immediately before engine stop or the surroundings of the internal combustion engine during engine stop, and the read-out values are used as values of the model parameters so as to calculate the temperature of exhaust gas at start-up through the model calculation. In this case, when the model parameter values are learned through the learning-to-correction on the parameter, the model parameter values stored as map are corrected based on the learning result.

Figure 2:
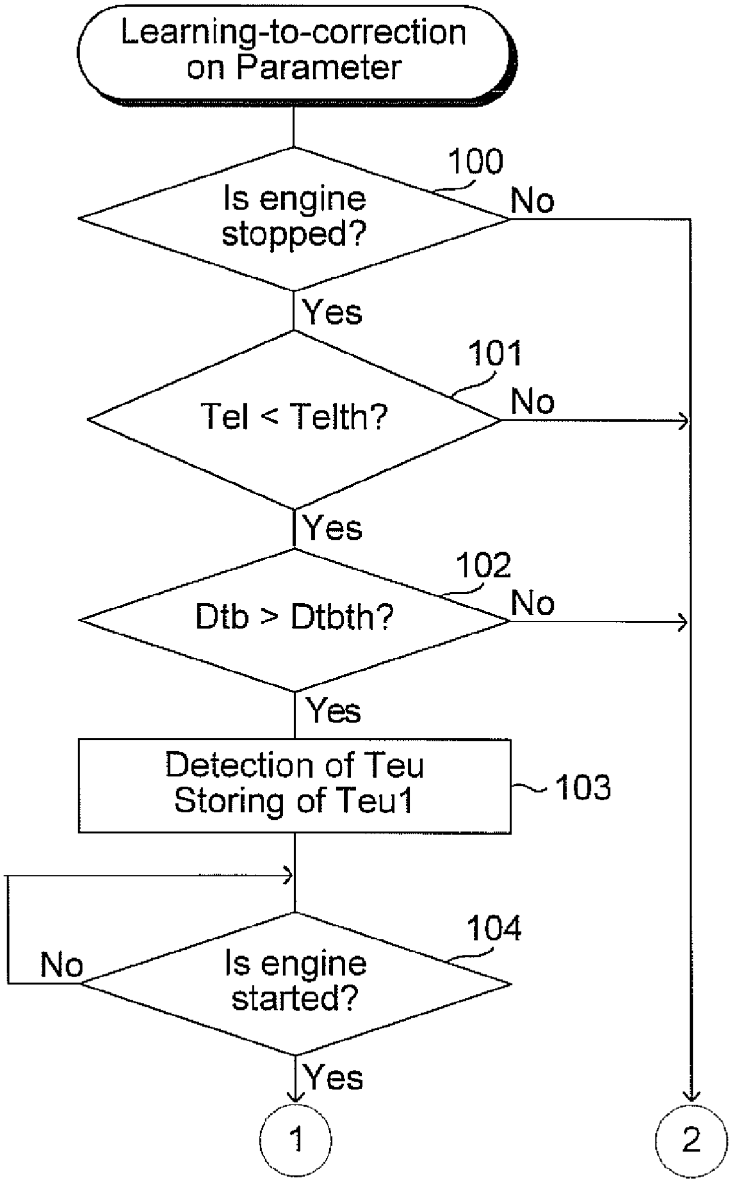
FIG. 2 is a diagram illustrating an example of a routine through which a learning-to-correction on the parameter is executed according to an embodiment of the present invention.
Figure 3:
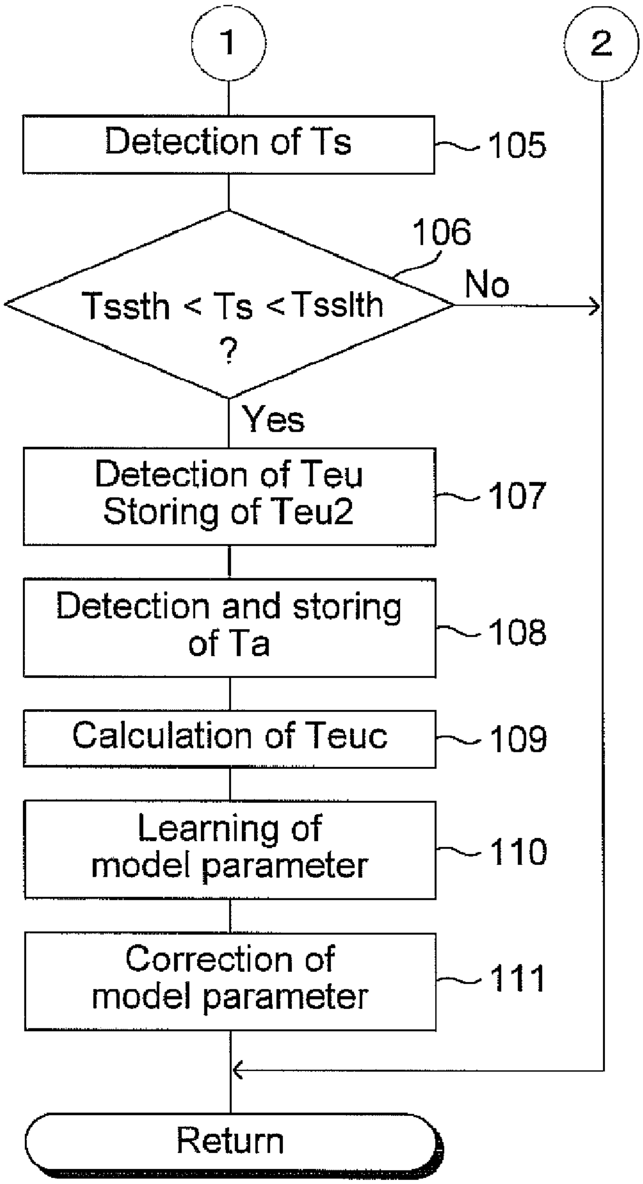
FIG. 3 is a diagram illustrating an example of a routine through which a learning-to-correction on the parameter is executed according to an embodiment of the present invention.

Now, an example of a routine through which the learning-to-correction on the parameter is executed according to the aforementioned embodiment is described. The routine is illustrated in FIGS. 2 and 3. The routine is executed at a predetermined time interval.

When the routine in FIGS. 2 and 3 is started, it is determined whether the engine operation is stopped in step 100 of FIG. 2. When it is determined that the engine operation is stopped, the routine proceeds to step 101. Meanwhile, when it is determined that the engine operation is not stopped, the routine ends at that point.

When it is determined that the engine operation is stopped in step 100 and the routine proceeds to step 101, it is determined whether the high load duration Tel is less than the first learning prohibition threshold value Telth (Tel<Telth). When it is determined to be Tel<Telth, the routine proceeds to step 102. Meanwhile, when it is determined to be Tel≥Telth, it means that the wall temperature of the exhaust manifold at engine stop is significantly high. If the learning-to-correction on the parameter using the temperature detected by the upstream-side temperature sensor 64 is executed, the accuracy of the calculated value of the temperature of exhaust gas at start-up which is calculated by the model calculation thereafter is degraded. Accordingly, the routine ends at that point.

When it is determined that the engine operation is stopped in step 100, it is determined to be Tel<Telth in step 101, and then the routine proceeds to step 102, it is determined whether the opening degree Dtb of the turbine bypass valve 67 is more than the learning prohibition opening degree threshold value Dtbth (Dtb>Dtbth).

When it is determined to be Dtb>Dtbth in step 102, the routine proceeds to step 103. Meanwhile, when it is determined to be Dtb≤Dtbth, the temperature which is detected by the upstream-side temperature sensor 64 at engine stop does not match the temperature of exhaust gas remaining in the exhaust manifold 61. When the learning-to-correction on the parameter using the temperature detected by the upstream-side temperature sensor is executed, the accuracy of the calculated value of the temperature of exhaust gas at start-up which is calculated by the model calculation thereafter is degraded. Accordingly, the routine ends at that point.

When it is determined that the engine operation is stopped in step 100, it is determined to be Tel<Telth in step 101, it is determined to be Dtb>Dtbth in step 102, and then the routine proceeds to step 103, the temperature Teu which is detected by the upstream-side temperature sensor 64 is acquired, and the temperature Teu is stored as temperature of exhaust gas actual measurement value at stop Teu1 in the electronic control unit 80. Subsequently, it is determined whether the engine operation is started in step 104. When it is determined that the engine operation is started, the routine proceeds to step 105 in FIG. 3. Meanwhile, when it is determined that the engine operation is not started, the routine repeats step 104. Specifically, step 104 is repeated until it is determined that the engine operation is started in step 104.

When it is determined that the engine operation is started in step 104 and the routine proceeds to step 105, the time (that is, the engine stop duration) Ts elapsed from the determination that the engine operation is stopped in step 100 to the determination that the engine operation is started in step 104 is acquired. Subsequently, in step 106, it is determined whether the engine stop duration Is acquired in step 105 is more than the second learning prohibition threshold value Tssth and is less than the third learning prohibition threshold value Tsslth (Tssth<Ts<Tsslth).

When it is determined to be Tssth<Ts<Tsslth in step 106, the routine proceeds to step 107. Meanwhile, when it is determined to be Ts≤Tssth or Ts≥Tsslth, it means that a decrease amount of the temperature of exhaust gas in the exhaust manifold 61 during engine stop is excessively small or excessively large. Accordingly, when the learning-to-correction on the parameter using the temperature detected by the upstream-side temperature sensor 64 is executed, the accuracy of the calculated value of the temperature of exhaust gas at start-up which is calculated by the model calculation thereafter is degraded. Therefore, the routine ends at that point.

When it is determined to be Tssth<Ts<Tsslth in step 106 and the routine proceeds to step 107, the temperature Teu which is detected by the upstream-side temperature sensor 64 is acquired, and the temperature is stored in the electronic control unit 80 as temperature of exhaust gas actual measurement value at start-up Teu2. Subsequently, in step 108, the temperature Ta which is detected by the external air temperature sensor 58 is stored in the electronic control unit 80. Subsequently, in step 109, the calculated value of the temperature of exhaust gas Teuc at engine start-up is calculated through the model calculation, and the calculated value Teuc is stored in the electronic control unit 80. Subsequently, in step 110, the optimal value is learned (that is, calculated) as model parameter value based on the temperature of exhaust gas actual measurement value at stop Teu1 stored in step 103, the temperature of exhaust gas actual measurement value at start-up Teu2 stored in step 107, the external air temperature Ta stored in step 108, and the calculated value of the temperature of exhaust gas Teuc at engine start-up stored in step 109. Subsequently, in step 111, the model parameter value is corrected in accordance with the model parameter value learned in step 110 and the routine ends.

The invention claimed is:

1. An internal combustion engine comprising an exhaust manifold connected to a body of the internal combustion engine at one end of the exhaust manifold;

an exhaust pipe connected to the other end of the exhaust manifold;

a supercharger including an exhaust turbine located in the exhaust pipe;

a temperature sensor that measures a temperature of an exhaust gas of the engine, the temperature sensor being located in the exhaust pipe downstream of the exhaust turbine;

a turbine bypass pipe, through which the exhaust gas bypasses the exhaust turbine;

a turbine bypass valve that opens and closes the turbine bypass pipe; and an electronic control unit programmed to:

execute a model-calculation on a temperature of the exhaust gas to calculate a calculated value of the temperature of the exhaust gas in the exhaust manifold of the internal combustion engine upon an operation of the internal combustion engine being started by using a model representing a behavior of the temperature of the exhaust gas in the exhaust manifold during the operation of the internal combustion engine being stopped, the model including at least one parameter;

output a measured value of the temperature of the exhaust gas detected by the temperature sensor at a first time point where the internal combustion engine being stopped when the opening degree of the turbine bypass valve is more than a threshold value;

calculate a calculated value of the temperature of the exhaust gas at a second time point where the internal combustion engine being started after the first time point through the model-calculation based on the measured value output at the first time point;

output a measured value of the temperature of the exhaust gas detected by the temperature sensor at the second time point when the opening degree of the turbine bypass valve is more than the threshold value; and execute a learning-to-correction on the at least one parameter to learn and correct the at least one parameter included in the model so as to match the calculated value of the temperature of the exhaust gas at the second time point to the measured value of the temperature of the exhaust gas output at the second time point.

2. The internal combustion engine according to claim 1, wherein the electronic control unit is programmed to stop the operation of the internal combustion engine at a frequency enabling an accuracy of the at least one parameter included in the model to be maintained in an acceptable accuracy.

3. The internal combustion engine according to claim 1, wherein the electronic control unit is programmed to prohibit the execution of the learning-to-correction on the at least one parameter upon the internal combustion engine having been continuously in a high-load operation state until immediately before the operation of the internal combustion engine being stopped and a high-load duration time being equal to or more than a threshold value, the high-load duration time being a time period where the internal combustion engine being continuously in the high-load operation state.

4. The internal combustion engine according to claim 1, wherein the electronic control unit is programmed to prohibit the execution of the learning-to-correction on the at least one parameter upon an engine-being-stopped duration time being equal to or less than a threshold value corresponding to an excessively short period, the engine-being-stopped duration time being a time period where the operation of the internal combustion engine being stopped.

5. The internal combustion engine according to claim 1, wherein the electronic control unit is programmed to prohibit the execution of the learning-to-correction on the at least one parameter upon an engine-being-stopped duration time being equal to or more than a threshold value corresponding to an excessively long period, the engine-being-stopped duration time being a time period where the operation of the internal combustion engine being stopped.

6. The internal combustion engine according to claim 1, wherein the electronic control unit is programmed to:

execute a model-calculation on a supercharging pressure to calculate a calculated value of the supercharging pressure by the supercharger by using a model representing a behavior of the supercharging pressure by the supercharger during the supercharger being operated, and use the calculated value of the temperature of the exhaust gas calculated through the model-calculation on the temperature of the exhaust gas in the model-calculation on the supercharging pressure.

* * * * *